United States Patent [19]

Richard

[11] 4,266,656
[45] May 12, 1981

[54] ENDLESS CHAIN FOR INSTALLATIONS TREATING CONTINUOUSLY MOVING ARTICLES

[75] Inventor: Jacques R. Richard, Cachan, France

[73] Assignee: Manufacture de Machines du Haut-Rhin S.A., Mulhouse-Cedex, France

[21] Appl. No.: 947,264

[22] Filed: Sep. 29, 1978

[30] Foreign Application Priority Data

Sep. 30, 1977 [FR] France .................. 77 29500

[51] Int. Cl.³ ............................................ B65G 17/18
[52] U.S. Cl. .................................................. 198/655
[58] Field of Search ............... 198/645, 655, 851, 476, 198/730, 734

[56] References Cited

U.S. PATENT DOCUMENTS 3,572,490  3/1971  Babunovic ..................... 198/476

FOREIGN PATENT DOCUMENTS 7017433  6/1972  Netherlands ........................ 198/655
159821  10/1921  United Kingdom ............... 198/655

Primary Examiner—James L. Rowland

[57] ABSTRACT

An endless chain for an apparatus which carries a plurality of articles to be treated around one or more article-treating drums, the chain and articles being continuously in motion. The chain is formed of a plurality of serially connected links which are joined to each other by pivotal connections, the axes of the pivotal connections being parallel to each other and parallel to the axes of the drums around which the chain travels. Each link has at least one cavity therein which receives the product to be treated, the cavity being of such shape that the product can be introduced thereinto and removed therefrom in a direction perpendicular to the plane containing the axes of the pivotal connecting means for the respective link. The chain travels upon a fixed guide upon which it slides, such fixed guide guiding the links laterally, the chain travelling between parallel fixed guides which prevent the escape of the articles from the cavities except at points where at least one of such latter guides is interrupted. The chain carries driving means which mesh with one or more sprockets mounted to turn about axes fixed with respect to the chain. The sprockets may be affixed to the article-treating drums coaxially thereof.

5 Claims, 7 Drawing Figures

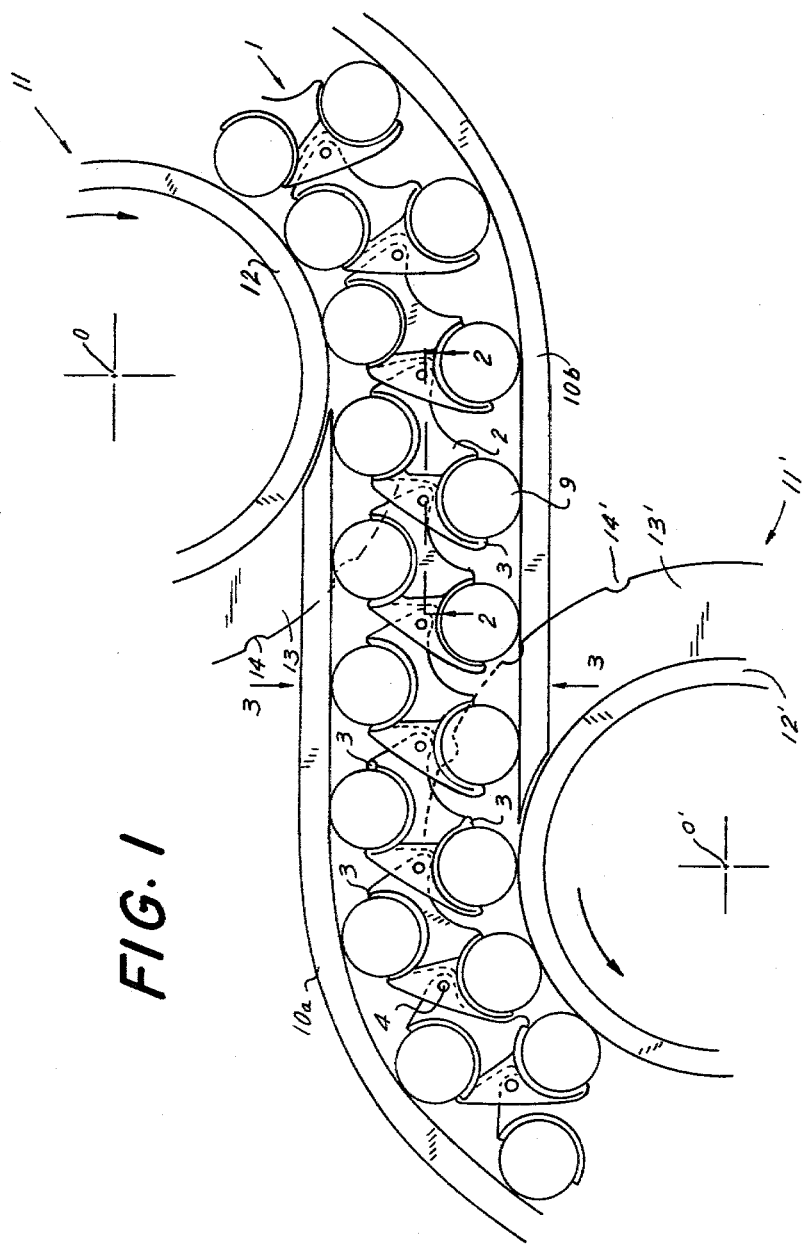
FIG. I

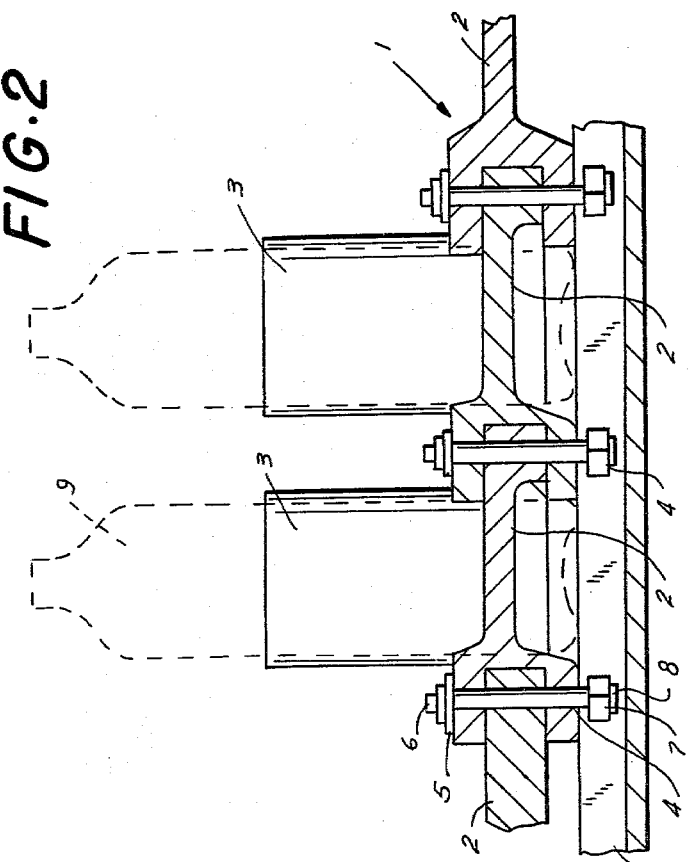
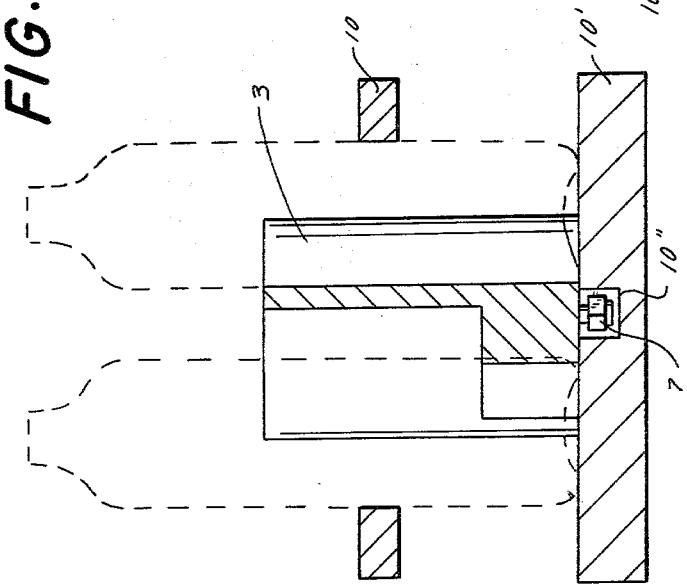

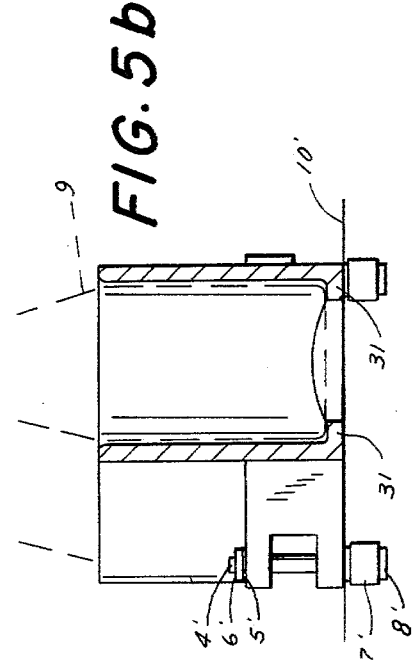
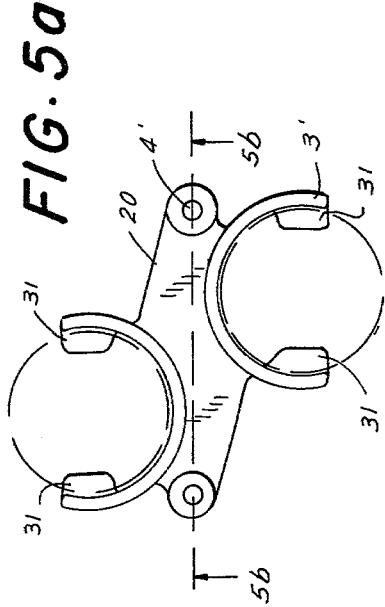
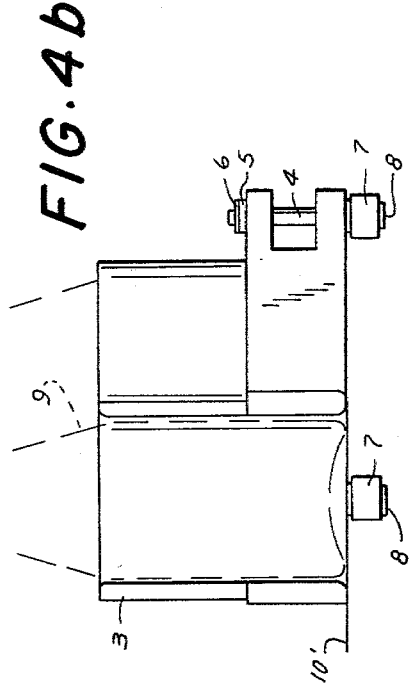
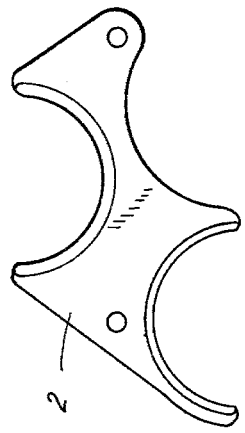

ENDLESS CHAIN FOR INSTALLATIONS TREATING CONTINUOUSLY MOVING ARTICLES

This application is related to U.S. Application Ser. No. 891,915, filed Mar. 30, 1978, now abandoned and to U.S. patent application Ser. No. 917,575, filed June 21, 1978, corresponding to French Application Ser. No. 77 19 197.

This invention relates to an endless chain for transporting articles, such chain being employed, for example, in installations which treat continuously moving articles.

It is known to transport articles on endless chains in installations for treating continuously moving articles. In such installations, the articles continuously move at a constant speed around successive operating drums at which treating operations are carried out upon the articles, such treatment being effected by operating mechanisms at the drums, the uniform speed of travel of the articles being neither interrupted nor altered. Installations of this type are disclosed in French Pat. No. 2,250,692, in U.S. patent application Ser. No. 891,915, filed Mar. 30, 1978, and in the above-referred to U.S. patent application Ser. No. 917,575, filed June 21, 1978, corresponding to French Patent Application No. 77 19 197. In such known installations the articles are carried in "vehicles" successive ones of which are connected to each other to form an endless chain which passes through the whole installation or a part of it.

Such vehicles are generally in the form of cups, provided with a bottom upon which the article being transported rests, the cups being provided with continuous lateral walls which prevent all lateral displacement of the articles, the cups being open at the top to permit the introduction and discharge of the articles.

Such article-transporting vehicles, connected in a chain, have a number of inconveniences. Thus the driving means for the chain is somewhat complicated and the freedom of choice of the path of travel of the articles is limited. Further, the rather appreciable dimensions and weight of the vehicles and the chain formed therefrom sometimes give rise to injury to the articles upon a sudden stoppage of the operating drums of the installation.

The installations shown in the above-cited French Patent, and the two U.S. Patent Applications referred to above, themselves have certain inconveniences. Each vehicle is relatively complex and represents a substantial expense, so much so that the price of construction of a continuously moving installation of the type described, provided with a large number of vehicles, is quite high. The endless chain made up of such vehicles is relatively heavy; this increases the inertia of the installation upon starting and stopping thereof, as well as the energy lost through friction. Also, the articles can be introduced into the vehicles and withdrawn therefrom only in a direction parallel to the axis of the vehicle; this represents a complication, and in certain cases, a marked drawback.

The invention has among its objects the overcoming of the above outlined drawbacks of the prior art, and to provide an endless chain for transporting articles, particularly through a continuously moving installation or a part thereof. The chain of the present invention is much lighter and much more economical to make than those of the prior art, and permits the introduction and withdrawal of articles laterally from the cavities in the vehicles in a particularly simple manner.

The chain of the invention is constituted by a plurality of links connected to each other by pivotal joints the axes of which are parallel to each other, the chain being able to be bent in a plane perpendicular to the axes of such joints, each link of the chain having at least one cavity having a shape complementary to the form of the article being treated in the installation in which the chain is employed. The cavity is made in such manner that the article may be introduced thereinto and removed therefrom in a direction essentially perpendicular to the plane containing the axes of the two pivotal joints of the link or vehicle containing such cavity, the chain travelling along a fixed guideway upon which it slides, there being fixed guides associated with such guideway for guiding the links laterally. Fixed guides prevent the articles contained in the cavities from escape therefrom except at special locations where the guides are interrupted to permit the removal of the articles from the cavities or their introduction thereinto. Finally, the chain has means thereon cooperating with a fixedly positioned driving assembly to drive the chain in a direction along its length.

The invention will be described in greater detail upon referring to two preferred embodiments thereof shown in the accompanying drawings, in which:

FIG. 1 is a fragementary view in plan of a first embodiment of chain in accordance with the invention, the chain being shown extending between two article-treating drums of an installation through which the chain continuously moves;

FIG. 2 is a view partially in side elevation and partially in vertical section through adjacent links of the chain, the section being taken along the line 2—2 in FIG. 1;

FIG. 3 is a view in vertical transverse section through a link of the chain, the section being taken along the line 3—3 in FIG. 1;

FIG. 4a is a view in plan of one link or vehicle of the chain of FIG. 1;

FIG. 4b is a view in side elevation of the link or vehicle of FIG. 4a;

FIG. 5a is a view in plan of a second embodiment of link or vehicle of the chain in accordance with the invention, and FIG. 5b is a view partially in side elevation and partially in vertical section through the link or vehicle of FIG. 5a, the section being taken along the line 5b—5b in that figure.

Turning first to FIG. 1, an article-transporting chain 1 is shown passing around two successive article-treating drums 11 and 11', the drums turning in the directions indicated by the curved arrows. In such figure the parts are shown in a simplified manner, parts of the article-treating drums not necessary to a comprehension of the invention being omitted. It is to be understood that in practice the chain 1 passes around a number of drums greater than 2, and that the ends of the chain are joined to form an endless chain. In FIG. 1 only a short section of the endless chain is shown.

Chain 1 is constituted by a plurality of identical links or vehicles 2, adjacent links being joined to each other by pivotal connections 4 the axes of which are all parallel to each other, so that the chain 1 can bend in a plane perpendicular to such axes.

Each link 2 has at least one cavity therein defined by a semi-collar 3, the cavities being adapted to each receive an article 9 to be treated. In the embodiment shown, the articles 9 are cylindrical bottles, and as a consequence the cavities in the links 2 are of semi-circular form. The articles 9 are maintained in the cavities by means including the semi-collars 3, by fixed spaced parallel guards 10a and 10b, and by a fixed guideway 10' along which the chain slides. The guideway 10' supports the articles 9 as well as the links 2. The guideway 10' has a groove 40" disposed centrally therein, groove 10" being open at the top and receiving roller 7 mounted on the lower ends of the pivot pins which form a part of the pivotal connecting means between successive links. The rollers 7 are disposed above enlarged lower ends 8 of such pivot pins, each of the pivot pins being held in place by a spring ring 6 associated with a washer 5.

A wheel 13 associated with drum 11 and turning therewith is provided with a plurality of equally angularly spaced recesses 14 in its rim. A similar wheel 13', associated with drum 11' and turning therewith, has a plurality of similarly equally angularly spaced recesses 14' therein. Successive rollers 7 on the lower ends of the pivot pins between successive links of the chain are received in the recesses 14, 14' and, when the drums 11, 11' are driven in the directions shown, the chain travels in the direction from right to left in FIG. 1 along the guideway 10'.

Drum 11 has a collar 12 coaxial thereof and turning therewith, and drum 11' has a similar collar 12'. The peripheries of the collars 12, 12' are tangential to the laterally inner edge of the fixed guards 10a and 10b, respectively, the collars 12, 12' and the guards 10a, 10b functioning to maintain the articles 9 in the cavities formed by the semi-collars or sleeves 3, collars or sleeves 3 being open on their laterally outer sides which confront the collars 12, 12' and the fixed guards 10a, 10b.

In an installation wherein the endless chain 1 travels continuously, generally only one of the drums 11, 11', etc., is driven. Such driven drum drives the chain by the engagement of the roller 7 in the recesses 14 in the wheel 12 of the drum and thus drives the remaining drums through the chain 1.

Although in the described embodiment the articles carried by the chain 1 are circular bottles, the links of the chain may be made with cavities of such shape as to transport a large number of articles of different shapes, other than bottles, whether they be circular or non-circular. Thus it will be understood that the form of cavities in the links 2 of the chain 1 will in each case be adapted to the form of the articles being carried by the chain.

In the embodiment shown, each link 2 of the chain 1 has two cavities, but the invention may be employed with a chain made up of links each having only a single cavity. In such case, two designs are possible: the cavities may be disposed in such manner that all of the articles may be introduced thereinto or removed therefrom laterally from the same side of the chain, or they can be so disposed that the introduction of the articles into or their extraction from the cavities takes place on one side of the chain for odd numbered articles and to and from cavities on the other side of the chain for even numbered articles. In such latter case the links 2 are not all identical.

Turning now to FIGS. 5a and 5b, there is there shown a second embodiment of link or vehicle, designated 20, which may be employed to form an article-transporting chain similar to that designated 1 in FIGS. 1-4a. Parts in FIGS. 5a and 5b which are similar to those in FIGS. 1-4b are designated by the same reference characters with an added prime. The principal difference between the link or vehicle shown in FIGS. 4a and 4b on the one hand and that shown in FIGS. 5a and 5b on the other is that whereas the bottom of the article such as the bottle 9 rests directly upon the guideway 10' in the embodiment of FIGS. 4a and 4b, in the embodiment of FIGS. 5a and 5b there are provided two diametrically opposed inwardly projecting pads or fingers 31 upon which the bottom of the article 9 rests. Thus with the embodiment of FIGS. 5a and 5b the guideway 10' supports the link or vehicle 20, the link or vehicle in turn supporting the article 9. Thus the articles 9 remain supported at all times by the pads 31 and are not subject to jars and bumps which may occur in the first embodiment of the chain when support of the articles 9 is transferred, for example, from the wheel 13, to the guide 10', and then to the wheel 13'.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. In an installation wherein an endless chain formed of a plurality of article-transporting links is continuously driven in succession in a horizontal plane partially about a plurality of drums at which operations are performed on the articles, the improvement which comprises means for pivotally connecting successive links comprising pivot pins having axes parallel to each other, whereby the chain can bend horizontally in a plane perpendicular to the axes of the pivot pins, each link having two cavities therein which are laterally outwardly open, said cavities being mirror images of each other, each cavity receiving an article to be operated upon, said two cavities having such shape that articles can be introduced thereinto and removed therefrom laterally only in a direction perpendicular to the axes of the pivot pins of each link which join it to the adjoining links, a first, fixed horizontal guide supporting the chain along which the chain slides, a pair of spaced parallel second guides spanning the space between successive drums for guiding the chain laterally, each of the second guides cooperating with the cavities in the links which are laterally open toward it to prevent the introduction of articles laterally into and the withdrawal of articles laterally from the cavities except at locations where the respective second guides are interrupted, and means including a driven sprocket for driving the chain, the links forming the chain bearing formations thereon which mesh with the sprocket.

2. An installation according to claim 1, wherein the links are all identical.

3. An installation according to claim 1, wherein the cavities carry in their lower ends at least one pad upon which the article rests.

4. An installation according to claim 1, wherein the cavities in the links are open-ended at their bottoms, and the articles in the cavities engage and are supported by the first fixed guide.

5. An installation according to claim 1, wherein rollers are mounted on the lower ends of the pivot pins forming the pivotal connection between successive links, said rollers interfitting with the said sprocket means whereby to drive the chain.

* * * * *